US012663435B2

(12) United States Patent
Mittleman et al.

(10) Patent No.: US 12,663,435 B2
(45) Date of Patent: Jun. 23, 2026

(54) SYSTEM AND METHOD FOR SCANNING NEAR-FIELD OPTICAL MICROSCOPY

(71) Applicant: Brown University, Providence, RI (US)

(72) Inventors: Daniel Mittleman, Providence, RI (US); Angela Pizzuto, Pine Meadow, CT (US)

(73) Assignee: Brown University, Providence, RI (US)

( * ) Notice: Subject to any disclaimer, the term of this patent is extended or adjusted under 35 U.S.C. 154(b) by 336 days.

(21) Appl. No.: 18/404,780

(22) Filed: Jan. 4, 2024

(65) Prior Publication Data

US 2024/0219420 A1 Jul. 4, 2024

Related U.S. Application Data

(60) Provisional application No. 63/478,448, filed on Jan. 4, 2023, provisional application No. 63/478,453, filed on Jan. 4, 2023.

(51) Int. Cl.
*G01Q 60/30* (2010.01)
*B82Y 35/00* (2011.01)
*G01Q 60/42* (2010.01)

(52) U.S. Cl.
CPC .............. *G01Q 60/30* (2013.01); *B82Y 35/00* (2013.01); *G01Q 60/42* (2013.01)

(58) Field of Classification Search
CPC ........ G01Q 60/30; G01Q 60/42; G01Q 60/22; B82Y 35/00
See application file for complete search history.

(56) References Cited

U.S. PATENT DOCUMENTS

| | | | | |
|---|---|---|---|---|
| 4,186,034 A | | 1/1980 | Akeret | |
| 5,894,125 A | | 4/1999 | Brener et al. | |
| 5,936,237 A | * | 8/1999 | van der Weide | ...... B82Y 35/00 |
| | | | | 977/875 |
| 6,532,806 B1 | | 3/2003 | Xiang et al. | |

(Continued)

FOREIGN PATENT DOCUMENTS

| | | |
|---|---|---|
| AU | 2421925 A | 4/1926 |
| AU | 3061867 A | 6/1964 |

(Continued)

OTHER PUBLICATIONS

Arora , et al., "Electron and Hole Mobilities in Silicon as a Function of Concentration and Temperature", IEEE Transactions on Electron Devices, vol. 29, No. 2, Feb. 1982, pp. 292-295.

(Continued)

*Primary Examiner* — David A Vanore
(74) *Attorney, Agent, or Firm* — Banner & Witcoff, Ltd.

(57) ABSTRACT

A method for scanning near-field optical microscopy comprises illuminating an apertureless atomic force microscopy (AFM) probe with electromagnetic energy having a frequency in the Terahertz range, where the sample under observation includes a dielectric layer having a thickness greater than the radius of the tip of the AFM probe. A system for scanning near-field optical microscopy comprises a collimated light source for emitting collimated light, a photoconductive antenna for converting collimated light into electromagnetic energy having a frequency in the Terahertz range, an AFM probe, a sample comprising a dielectric layer, the dielectric layer having a thickness greater than the radius of the probe tip; and a detector configured to detect energy that has interacted with the sample.

20 Claims, 5 Drawing Sheets

(56) References Cited

U.S. PATENT DOCUMENTS

| | | | |
|---|---|---|---|
| 6,791,081 B1 | 9/2004 | Ulfig et al. | |
| 7,230,245 B2 | 6/2007 | Zhang et al. | |
| 7,459,687 B2 | 12/2008 | Federici et al. | |
| 7,760,364 B1 * | 7/2010 | Zhuang | B82Y 35/00 |
| | | | 356/237.1 |
| 7,978,343 B2 | 7/2011 | Sun et al. | |
| 8,004,290 B1 | 8/2011 | Zhang et al. | |
| 8,438,927 B2 | 5/2013 | Shekhawat et al. | |
| 8,793,811 B1 * | 7/2014 | Prater | G01Q 20/02 |
| | | | 850/30 |
| 9,846,178 B2 | 12/2017 | Andreev et al. | |
| 9,909,986 B2 | 3/2018 | Rahman et al. | |
| 10,845,382 B2 | 11/2020 | Su et al. | |
| 10,912,462 B2 | 2/2021 | Wang et al. | |
| 10,919,220 B2 | 2/2021 | Stevens | |
| 10,925,579 B2 | 2/2021 | Zhang et al. | |
| 10,939,825 B2 | 3/2021 | Tearney et al. | |
| 10,942,116 B2 | 3/2021 | Prater et al. | |
| 10,952,734 B2 | 3/2021 | Williams | |
| 10,955,652 B2 | 3/2021 | Hillman et al. | |
| 10,969,405 B2 | 4/2021 | Shetty et al. | |
| 10,969,406 B2 | 4/2021 | Osborne et al. | |
| 10,976,238 B2 | 4/2021 | Shan et al. | |
| 10,991,091 B2 | 4/2021 | Ezhov et al. | |
| 10,998,181 B2 | 5/2021 | Christian | |
| 11,002,665 B2 | 5/2021 | Prater et al. | |
| 11,002,677 B2 | 5/2021 | Ashrafi | |
| 11,002,757 B2 | 5/2021 | Hu et al. | |
| 11,011,354 B2 | 5/2021 | Gupta et al. | |
| 11,012,792 B2 | 5/2021 | Elmedyb et al. | |
| 11,027,101 B2 | 6/2021 | Lemon et al. | |
| 11,064,304 B2 | 7/2021 | Link et al. | |
| 11,065,005 B2 | 7/2021 | Sgroi | |
| 11,067,597 B2 | 7/2021 | Van Riel et al. | |
| 11,067,783 B2 | 7/2021 | Schumann | |
| 11,076,246 B2 | 7/2021 | Cahan et al. | |
| 11,079,315 B2 | 8/2021 | Messerschmidt | |
| 11,086,041 B2 | 8/2021 | Aponte Luis | |
| 11,102,594 B2 | 8/2021 | Shaquer et al. | |
| 11,105,682 B2 | 8/2021 | Leblond et al. | |
| 11,106,028 B2 | 8/2021 | Engel et al. | |
| 11,118,973 B2 | 9/2021 | Bickham et al. | |
| 11,122,372 B2 | 9/2021 | Giese et al. | |
| 11,123,099 B2 | 9/2021 | Cox et al. | |
| 11,134,348 B2 | 9/2021 | Mosgaard et al. | |
| 11,146,897 B2 | 10/2021 | Elmedyb et al. | |
| 11,146,898 B2 | 10/2021 | Neumeyer et al. | |
| 11,147,561 B2 | 10/2021 | Sgroi | |
| 11,150,489 B2 | 10/2021 | Cheng | |
| 11,156,633 B2 | 10/2021 | Sahin | |
| 11,158,486 B2 | 10/2021 | Sun et al. | |
| 11,166,114 B2 | 11/2021 | Perkins et al. | |
| 11,166,728 B2 | 11/2021 | Sgroi | |
| 11,175,306 B2 | 11/2021 | Marohn et al. | |
| 11,178,496 B2 | 11/2021 | Abolfathi et al. | |
| 11,179,028 B2 | 11/2021 | Tearney et al. | |
| 11,181,480 B2 | 11/2021 | Bartholomew | |
| 11,192,227 B2 | 12/2021 | Sgroi | |
| 11,209,509 B2 | 12/2021 | Dempsey et al. | |
| 11,209,636 B2 | 12/2021 | Kleppe et al. | |
| 11,215,637 B2 | 1/2022 | Dazzi et al. | |
| 11,218,814 B2 | 1/2022 | Elmedyb et al. | |
| 11,218,815 B2 | 1/2022 | Solum | |
| 11,219,501 B2 | 1/2022 | Shelton et al. | |
| 11,234,703 B2 | 2/2022 | Shen et al. | |
| 11,236,379 B2 | 2/2022 | Auner et al. | |
| 11,237,105 B2 | 2/2022 | Dazzi | |
| 11,243,391 B2 | 2/2022 | Hillman | |
| 2001/0029436 A1 | 10/2001 | Fukasawa | |
| 2003/0211336 A1 | 11/2003 | Tsai et al. | |
| 2004/0188602 A1 | 9/2004 | Chinn et al. | |
| 2006/0022141 A1 * | 2/2006 | Zhang | G01Q 60/12 |
| | | | 250/341.1 |
| 2008/0276695 A1 | 11/2008 | Prater et al. | |

| | | | |
|---|---|---|---|
| 2009/0050487 A1 * | 2/2009 | Fang | B23H 3/00 |
| | | | 205/135 |
| 2009/0119808 A1 | 5/2009 | Giakos | |
| 2012/0096601 A1 | 4/2012 | Schotland et al. | |
| 2014/0090118 A1 * | 3/2014 | Weber-Bargioni | G01Q 60/22 |
| | | | 427/526 |
| 2015/0077819 A1 | 3/2015 | Schnell et al. | |
| 2015/0338627 A1 * | 11/2015 | Erickson | G01Q 60/22 |
| | | | 427/163.2 |
| 2016/0116400 A1 | 4/2016 | Hunt et al. | |
| 2016/0116406 A1 | 4/2016 | Hunt et al. | |
| 2016/0139044 A1 | 5/2016 | Richter et al. | |
| 2017/0219622 A1 * | 8/2017 | Yang | G01Q 60/22 |
| 2019/0310284 A1 | 10/2019 | Van Es et al. | |
| 2019/0369139 A1 | 12/2019 | Mohtashami et al. | |
| 2020/0057028 A1 | 2/2020 | Piras et al. | |
| 2020/0217874 A1 | 7/2020 | Noller et al. | |
| 2020/0309816 A1 | 10/2020 | Fillinger et al. | |
| 2020/0348334 A1 | 11/2020 | Van Riel et al. | |
| 2021/0003608 A1 | 1/2021 | Sadeghian Marnani et al. | |
| 2021/0011053 A1 * | 1/2021 | Dazzi | G01N 21/3563 |
| 2021/0041477 A1 * | 2/2021 | Wang | G01Q 60/06 |
| 2021/0109128 A1 | 4/2021 | Piras et al. | |
| 2021/0318353 A1 | 10/2021 | Herfst et al. | |
| 2021/0389345 A1 | 12/2021 | Van Neer et al. | |
| 2022/0163559 A1 * | 5/2022 | Govyadinov | G01Q 60/34 |
| 2024/0219420 A1 * | 7/2024 | Mittleman | G01Q 60/30 |

FOREIGN PATENT DOCUMENTS

| | | | | | |
|---|---|---|---|---|---|
| AU | 3665668 | A | | 10/1964 | |
| BE | 446796 | A | | 8/1842 | |
| BE | 347469 | A | | 1/1928 | |
| BE | 483407 | A | | 7/1942 | |
| BE | 446424 | A | | 8/1942 | |
| BE | 468851 | A | | 11/1942 | |
| BE | 447907 | A | | 12/1942 | |
| BE | 478214 | A | | 1/1943 | |
| BE | 453176 | A | | 12/1943 | |
| BE | 459973 | A | | 10/1945 | |
| BE | 467536 | A | | 9/1946 | |
| BE | 473928 | A | | 7/1947 | |
| BE | 488798 | A | | 5/1949 | |
| BE | 505180 | A | | 8/1951 | |
| BE | 511236 | A | | 11/1952 | |
| CA | 360490 | A | | 9/1936 | |
| CN | 105628641 | A | * | 6/2016 | G01N 21/3586 |
| CN | 108133879 | A | | 6/2018 | |
| CN | 108414564 | A | | 8/2018 | |
| CN | 111505397 | B | | 7/2021 | |
| CN | 113607977 | A | * | 11/2021 | G01Q 60/22 |
| CN | 115791687 | A | * | 3/2023 | G01Q 60/22 |
| CN | 117871454 | A | * | 4/2024 | G01Q 60/22 |
| DE | 71190 | A | | 2/1970 | |
| DE | 102017001001 | A1 | * | 9/2018 | G01Q 60/32 |
| EP | 2811285 | A1 | | 12/2014 | |
| EP | 3722817 | A1 | * | 10/2020 | G01Q 60/38 |
| EP | 3896470 | A1 | | 10/2021 | |
| JP | H1114641 | A | * | 1/1999 | G01Q 60/22 |
| JP | 2021036239 | A | | 3/2021 | |
| WO | WO-2014129896 | A1 | * | 8/2014 | G01Q 60/40 |
| WO | WO-2019144128 | A2 | * | 7/2019 | G01Q 60/06 |
| WO | WO-2020123891 | A1 | * | 6/2020 | G01Q 30/20 |
| WO | 2020162743 | A1 | | 8/2020 | |
| WO | 2020162744 | A1 | | 8/2020 | |
| WO | 2021035312 | A1 | | 3/2021 | |
| WO | 2021125945 | A1 | | 6/2021 | |
| WO | 2021125947 | A1 | | 6/2021 | |
| WO | 2021144641 | A1 | | 7/2021 | |
| WO | 2021201684 | A1 | | 10/2021 | |
| WO | WO-2024148199 | A1 | * | 7/2024 | G01Q 60/22 |

OTHER PUBLICATIONS

Chen , et al., "Terahertz Imaging with Nanometer Resolution", Applied Physics Letter, vol. 83, No. 15, Oct. 13, 2003, Oct. 7, 2003, pp. 3009-3011.

(56)  References Cited

OTHER PUBLICATIONS

Hillenbrand , et al., "Pure Optical Contrast in Scattering-Type Scanning Near-Field Microscopy", Journal of Microscopy, vol. 202, Part 1, 2001, pp. 77-83.

Huber , et al., "Terahertz Near-Field Nanoscopy of Mobile Carriers in Single Semiconductor Nanodevices", NANO Letters, 2008, vol. 8, No. 11, Oct. 7, 2008, 3766-3770.

Jacob , et al., "Quantitative Determination of the Charge Carrier Concentration of Ion Implanted Silicon by IR-near-Field Spectroscopy", Optics Express, Dec. 6, 2010 Volume 18, Issue 25, Dec. 1, 2010, pp. 26206-26213.

Jin , et al., "Scanning Microwave Microscopy of Buried CMOS Interconnect Lines with Nanometer Resolution", International Journal of Microwave and Wireless Technologies, Apr. 17, 2018, 6 pages.

Kimura , et al., "Imaging of Au Nanoparticles Deeply Buried in Polymer Matrix by Various Atomic Force Microscopy Techniques", Ultramicroscopy, vol. 133, Oct. 2013, pp. 41-49.

Knoll , et al., "Enhanced Dielectric Contrast in Scattering-type Scanning Near-field Optical Microscopy", Optics Communications, vol. 182, Issues 4-6, Aug. 15, 2000, pp. 321-328.

Krutokhvostov , et al., "Enhanced Resolution in Subsurface Near-Field Optical Microscopy", Optics Express, Jan. 2, 2012, vol. 20, No. 1, Dec. 22, 2011, pp. 593-600.

Mittleman , et al., "Recent Advances in Terahertz Imaging", Applied Physics B, vol. 68, No. 6, Jan. 1999, pp. 1085-1094.

Moon , et al., "Subsurface Nanoimaging by Broadband Terahertz Pulse Near-Field Microscopy", Nano Letters, 2015, vol. 15, No. 1, Dec. 1, 2014, pp. 549-552.

Pizzuto , et al., "Nonlocal Time-Resolved Terahertz Spectroscopy in the Near Field", ACS Photonics, vol. 8, 2021, pp. 2904-2911.

Tabib-Azar , et al., "Design and Fabrication of Scanning Near-Field Microwave Probes Compatible with Atomic Force Microscopy to Image Embedded Nanostructures", IEEE Transactions on Microwave Theory and Techniques, vol. 52, No. 3, Mar. 15, 2004, pp. 971-979.

Taubner , et al., "Near-Field Microscopy Through a SiC Superlens", Science vol. 313, Issue 5793, Oct. 2006, pp. 1595.

Zenhausern , et al., "Scanning Interferometric Apertureless Microscopy: Optical Imaging at 10 Angstrom Resolution", Science, vol. 269, No. 5227, Aug. 25, 1995, pp. 1083-1085.

Zhang , et al., "Visibility of Subsurface Nanostructures in Scattering-Type Scanning Near-Field Optical Microscopy Imaging", Optics Express, Mar. 2, 2020, vol. 28, No. 5, Feb. 20, 2020, 6696-6707.

"International Search Report and Written Opinion received for PCT Patent Application No. PCT/US2024/010366, mailed on Apr. 24, 2024", 10 pages.

* cited by examiner

SYSTEM AND METHOD FOR SCANNING NEAR-FIELD OPTICAL MICROSCOPY

CROSS-REFERENCE TO RELATED APPLICATIONS

This application claims benefits from U.S. Provisional App. No. 63/478,448 filed Jan. 4, 2023, and U.S. Provisional App. No. 63/478,453 filed Jan. 4, 2023, which are incorporated by reference herein in its entirety.

STATEMENT REGARDING FEDERALLY SPONSORED RESEARCH OR DEVELOPMENT

This invention was made with government support under grant number ECCS-1904280 awarded by the National Science Foundation and grant number DE-NA0002839 awarded by the U. S. Department of Energy. The government has certain rights in the invention.

BACKGROUND

Field

The present disclosure relates generally to scanning near-field optical microscopy, and, in particular, to apertureless scanning near-field optical microscopy, and, further, to terahertz near-field optical microscopy.

Description of the Problem and Related Art

The implementation of near-field studies in the terahertz spectral range has been an active area of research. Although these aperture-based techniques have become quite sophisticated, they are ultimately limited by the physics of the transmission of radiation through sub-wavelength apertures, which becomes resolving sub-micron-scale features with terahertz waves (with wavelengths of hundreds of microns or more; 1 THz~300 μm).

A significant breakthrough occurred with the introduction of scattering-type apertureless scanning near-field optical microscopy (s-SNOM) [2]. This technique relies on the scattering of light from a sub-wavelength-sized metal tip inside an atomic force microscope (AFM), which is oscillating (tapping) near a sample surface (but not touching it). The radiation scattered from the tip-sample system contains information about the dielectric properties of the nearby surface. The technique can therefore be used for spectroscopy. Moreover, since the scattered light intensity is a nonlinear function of tip-sample separation, one can filter the signal at a harmonic of the tip's tapping frequency, such that the extracted spectroscopic information is characteristic of only the tiny region of the sample directly underneath the tip. This enables spectroscopic imaging with a spatial resolution determined by the size of the metal tip, essentially independent of the wavelength of the incident radiation.

Typical of s-SNOM is the use of an Atomic Force Microscope (AFM) which is a high-resolution type of scanning probe microscope that provides three-dimensional surface topography images at the nanoscale. The AFM operates by scanning a sharp tip over the surface of a sample while measuring the interaction forces between the tip and the atoms on the surface. The heart of the AFM is a tiny cantilever with a sharp tip at its free end. The tip is typically made of a material such as silicon or silicon nitride and has a radius of a few nanometers. The AFM tip is brought very close to the sample surface, within a few nanometers. As the tip scans across the surface, the interaction forces (such as van der Waals forces, electrostatic forces, and chemical forces) between the tip and the sample cause the cantilever to bend. A laser beam is typically focused on the back of the cantilever. The deflection of the cantilever causes changes in the position of the laser beam on a position-sensitive photodetector. These changes are then used to generate a feedback signal to maintain a constant force between the tip and the sample, allowing precise control of the tip-sample distance. The feedback mechanism is used to maintain a constant force as the tip scans the sample in a raster pattern. The vertical movements of the tip are recorded, and this information is used to construct a topographic image of the sample surface with nanometer-scale resolution. AFMs can operate in different modes, including contact mode, tapping mode, and non-contact mode, each offering specific advantages and applications. s-SNOM, therefore, combines the capabilities of Atomic Force Microscopy (AFM) with near-field optical microscopy to achieve high-resolution imaging beyond the diffraction limit of conventional optical microscopes.

The AFM includes a sharp tip at the end of a cantilever, which is used for topographic imaging of the sample surface. The AFM tip is brought into proximity with the sample surface, typically within a few nanometers. As the AFM tip scans the sample surface, it detects the topography with high spatial resolution, providing topographic information. Simultaneously, the sample is illuminated with an optical source, often a laser, which is focused on the AFM tip. The near-field interaction between the sample and the AFM tip modifies the optical signals, and the scattering of light is influenced by the local properties of the sample. The scattered optical signals, which carry information about the near-field optical properties of the sample, are collected.

The AFM and optical signals are detected simultaneously, allowing for the correlation of topographic information obtained by the AFM with the near-field optical properties of the sample. The combination of AFM and near-field optics allows for sub-wavelength spatial resolution, enabling researchers to obtain detailed images of nanoscale features and optical properties of the sample.

However, few studies have considered the possibility of imaging sub-surface features, situated some distance beneath a transparent (to THz waves) capping layer that is thicker than the size of the field confinement region near the AFM tip, which is essentially equal to the tip radius).

SUMMARY

For purposes of summary, certain aspects, advantages, and novel features are described herein. It is to be understood that not necessarily all such advantages may be achieved in accordance with any one particular embodiment. Thus, the apparatuses or methods claimed may be embodied or carried out in a manner that achieves or optimizes one advantage or group of advantages as taught herein without necessarily achieving other advantages as may be taught or suggested herein.

In a first aspect, a method for imaging metallic patterns deposited on the surface of semiconductor materials comprises illuminating an apertureless atomic force microscopy (AFM) probe with electromagnetic energy having a frequency in the Terahertz range, where the sample under observation comprises a dielectric layer having a thickness greater than the radius of the tip of the AFM probe.

In another aspect, a method is disclosed for non-destructive testing using an AFM probe where the method comprises detecting terahertz electromagnetic energy reflected from a sample, the terahertz electromagnetic energy originating from a collimated light source, and the sample includes a dielectric layer with a thickness greater than the radius of the probe tip, and where the probe tip oscillates at a distance of between about 5 nm and about 255 nm from said sample.

In yet another aspect, an exemplary system for scanning near-field optical microscopy comprises a collimated light source for emitting collimated light, a photoconductive antenna for converting collimated light into electromagnetic energy having a frequency in the Terahertz range, an AFM probe, a sample comprising a dielectric layer, the dielectric layer having a thickness greater than the radius of the probe tip; and a detector configured to detect energy that has interacted with the sample.

BRIEF DESCRIPTION OF THE DRAWINGS

The disclosed system and method are described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The various embodiments of the system and method disclosed herein and their advantages are best understood by referring to FIGS. 1 through 4D of the drawings. The elements of the drawings are not necessarily to scale, emphasis instead being placed upon clearly illustrating the novel features and principles of operation. Throughout the drawings, like numerals are used for like and corresponding parts of the various drawings.

Furthermore, reference in the specification to "an embodiment," "one embodiment," "various embodiments," or any variant thereof means that a particular feature or aspect described in conjunction with the particular embodiment is included in at least one embodiment. Thus, the appearance of the phrases "in one embodiment," "in another embodiment," or variations thereof in various places throughout the specification are not necessarily all referring to its respective embodiment.

Figure 1:
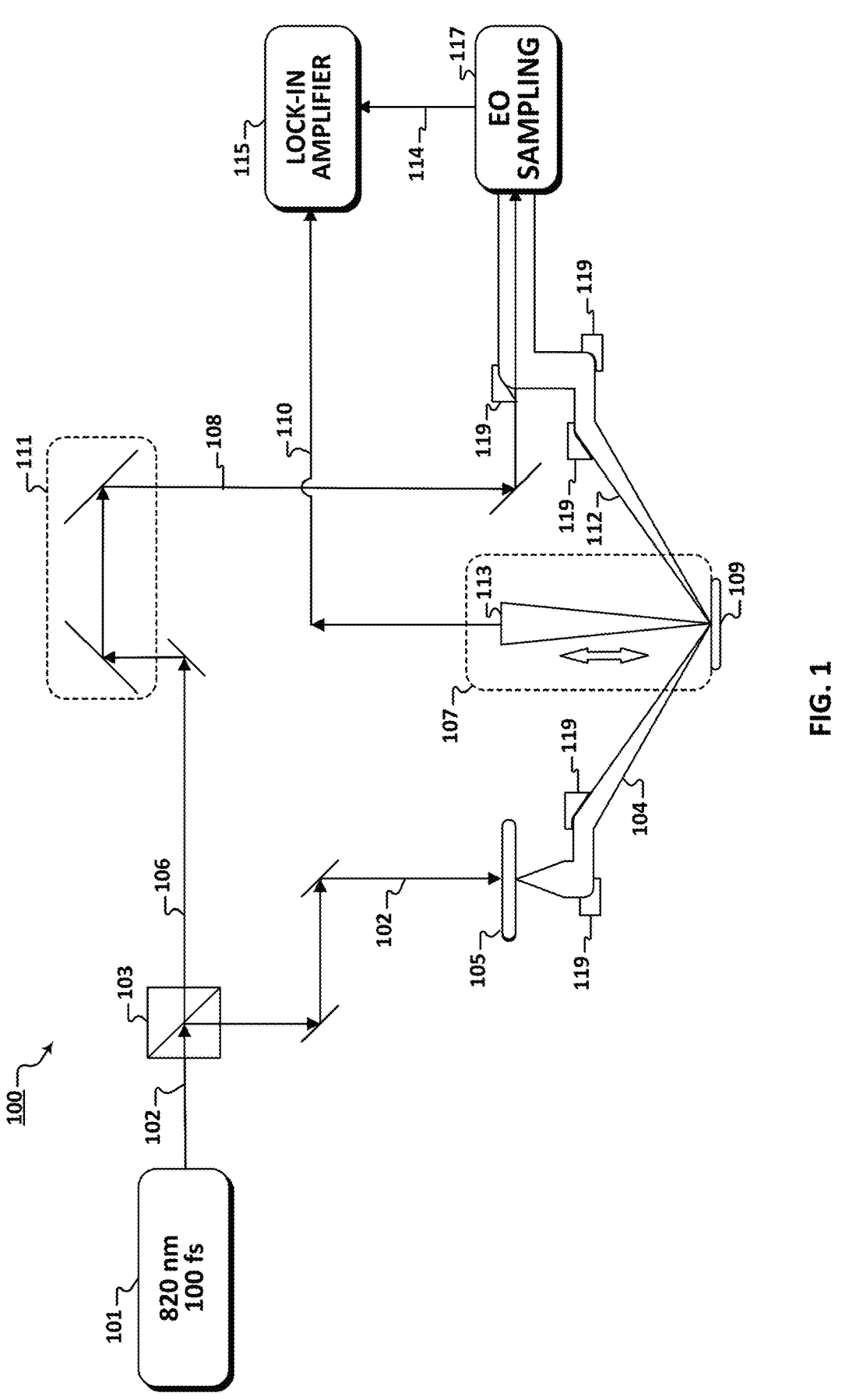
FIG. 1 is a diagram of an exemplary system for scanning near-field optical microscopy (SNOM)

With reference to FIG. 1, an exemplary system 100 for scanning near-field optical microscopy (SNOM) comprises an atomic force microscope (AFM) 107 that includes a cantilevered, apertureless probe 113. A light source 101 emits pulsed, collimated light 102, preferably at a wavelength of 820 nm and a pulse width of approximately 100 fs. Pulsed light 102 interacts with beam-splitter 103 which redirects a portion of pulsed light 102 to a photoconductive antenna (PCA) 105 which converts pulsed light 102 into radio frequency (RF) energy 104 in the terahertz frequency range. Terahertz RF energy 104 is directed via waveguides 119 to probe 113 and sample 109 under observation in AFM 107. A portion of pulsed light emerges from beam splitter 103 to provide a reference signal 106 which is directed to a delay line 111.

Figure 2:
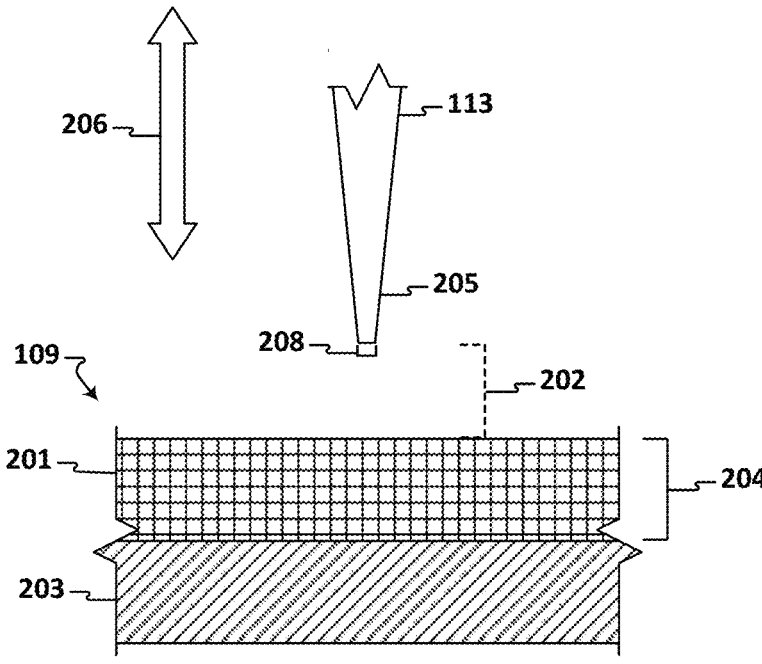
FIG. 2 is an isolated view showing the relationship between an AFM probe tip and sample.

FIG. 2 shows probe 113 in isolation above sample 109 separated by a gap 202 from probe tip 205 to the surface of sample 109. In operation, probe 113 is oscillated 206 at a tapping frequency such that the distance of gap 202 varies between about 5 nm and about 255 nm. Tapping frequency may be about 20 Hz. Sample 109 may comprise substrate 203 which may include defects in its surface and a dielectric capping layer 201 overlaying substrate 203, which may be, for example, a silicon wafer. Dielectric layer 201 may comprise, for example, a silica layer and may be a thickness 204 that in some embodiments is greater than the radius 208 of probe tip 205. In another embodiment, thickness 204 is about five times greater than the radius 208 of probe tip 205. In yet another embodiment, thickness 204 of layer 201 is between about 200 nm to about 400 nm.

For typical AFM, the tip is indeed made of silicon or silicon nitride, a dielectric, and the apex can be as small as a few nanometers in diameter. But for this terahertz application, "typical" AFM tips cannot be used. This method must employ metal tips. Any metal tip may be used, but in a preferred embodiment, tips may be composed of a platinum-iridium alloy. Also, the conventional AFM tip is pyramidal shaped, but this places the cantilever arm too close to the sample surface such that the terahertz beam is blocked from reaching the surface by the cantilever itself. Therefore, the conical tip needs to be at the end of a relatively long (like 80 micron) cylindrical shank, so that the cantilever which holds it is farther away from the sample surface. In this system 100, probe 113 may have between about 80 to about 100 micron shanks, and with that taper down to a tip of about 20 nanometers minimum size.

Referring again to FIG. 1, terahertz energy 104 is directed to probe 113, and in particular, to probe tip (FIG. 2: 205) whereupon energy 104 is scattered toward sample 109. Reflected energy 112 is collected by waveguides 119 and directed to electro-optical sampler 117 for detection and analysis. At the same time a portion of collimated light exits beam-splitter 103 as reference signal 106 which is directed to a delay line 111 providing an optical signal 108 to electro-optical sampler 117 where it is modulated by reflected energy 112. A modulated detected signal 114 is conveyed to lock-in amplifier 115.

AFM 107 also provides a demodulation signal 110 which is the reference for the lock-in amplifier 115. Demodulation signal 110 includes data regarding the tapping frequency of the AFM 107 cantilevered probe 113, or a multiple of it. AFM 107 supplies a signal which is the position of the cantilevered probe 113 vs. time, and which therefore oscillates at the mechanical resonance of the cantilever, which is approximately 20 kHz in this case. Demodulation signal 110 can also provide signals at multiples of this frequency (i.e., approximately 40 kHz, 60 kHz, etc), which are referred to as the "harmonics" of the tapping frequency. Lock-in amplifier 115 demodulates detected signal 114 at one of these harmonic frequencies. by providing this as the reference frequency for the lock-in. Most often the $2^{nd}$ harmonic which is near 40 KHz is used. Exact values of these frequencies are determined by the precise mass of the cantilever, and are not fundamental to the method.

A program of experimental study was conducted of well characterized and controlled samples consisting of transistor devices fabricated on one side of a thinned silicon wafer (with various different thicknesses), together with a computational effort directed towards the development of a numerical model for quantitative extraction of material parameters of the buried structures. The possibility was explored that the incident THz field, plasmonically enhanced through near-field interactions with the extended metal AFM tip, may be large enough to perturb the local carrier density in the semiconductor underneath the tip, leading to a measurable effect on the electrical properties of the nearby silicon device.

The feasibility of obtaining near-field spectroscopic images through a low-loss high-dielectric layer was investigated. A typical sample consisted of a series of well-spaced transistor structures, with known spatially varying doping profiles, fabricated on one side of a high-resistivity Si wafer which is then subsequently thinned to a desired thickness. Samples were probed using s-SNOM methods from the thinned back side of the wafer. The strength of the scattered THz near-field signal and the lateral spatial resolution, as a function of the thickness of this dielectric layer, over a range of thicknesses from 0.1-1 micron were determined. When possible, images of the transistor structures were formed using both of these measurement parameters, employing the 2D scanning capabilities of the AFM stage. Spectroscopic information was investigated in an attempt to extract quantitative measures of local doping density at each pixel of these images.

Figure 3B:
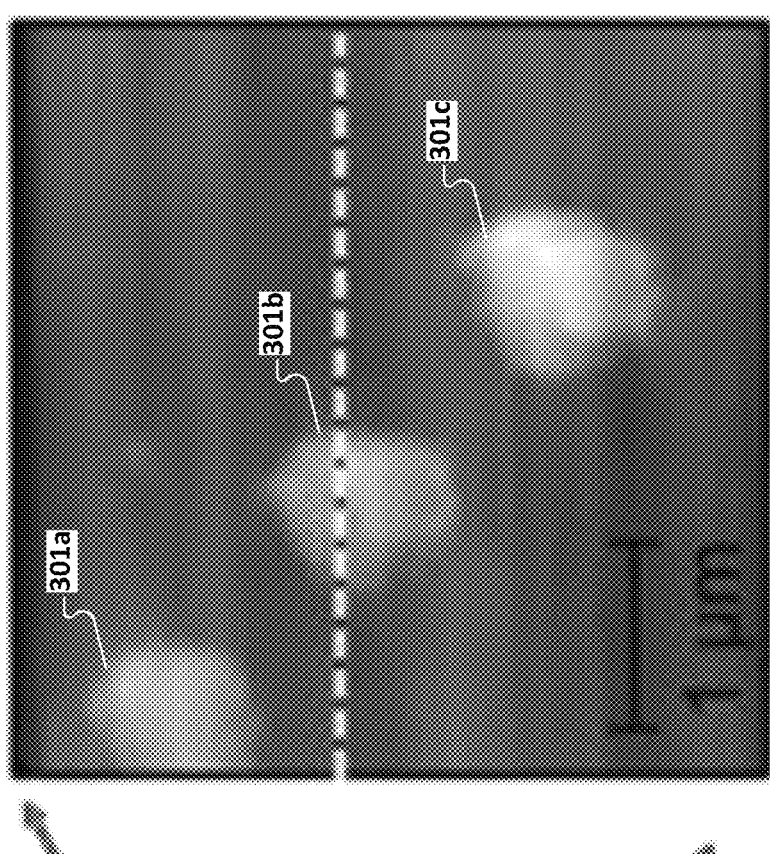
FIG. 3B is an AFM image of the sample of FIG. 3A.
Figure 3A:
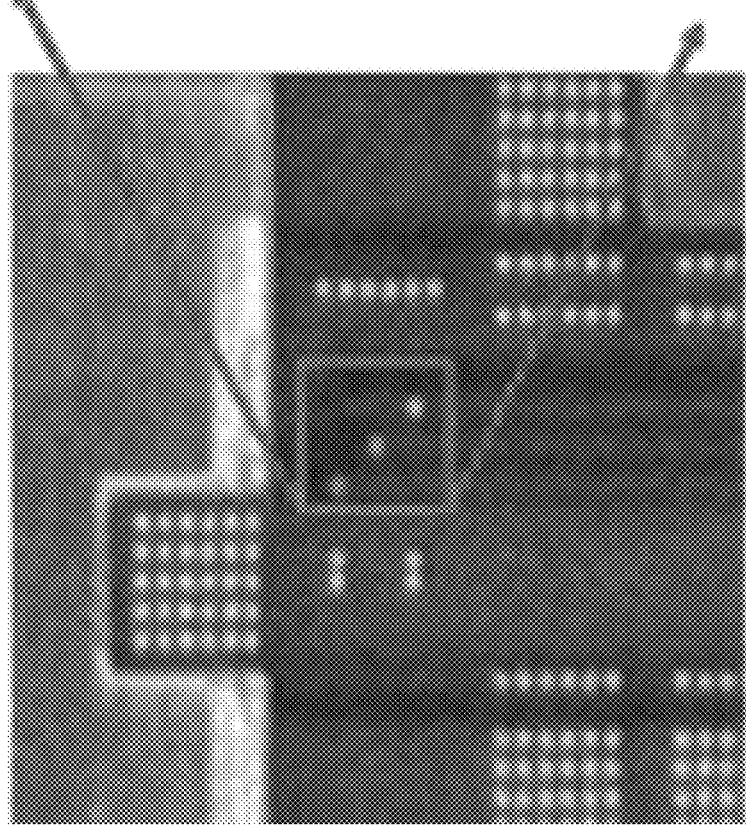
FIG. 3A is a scanning electron microscope image of a sample.
Figure 4A:
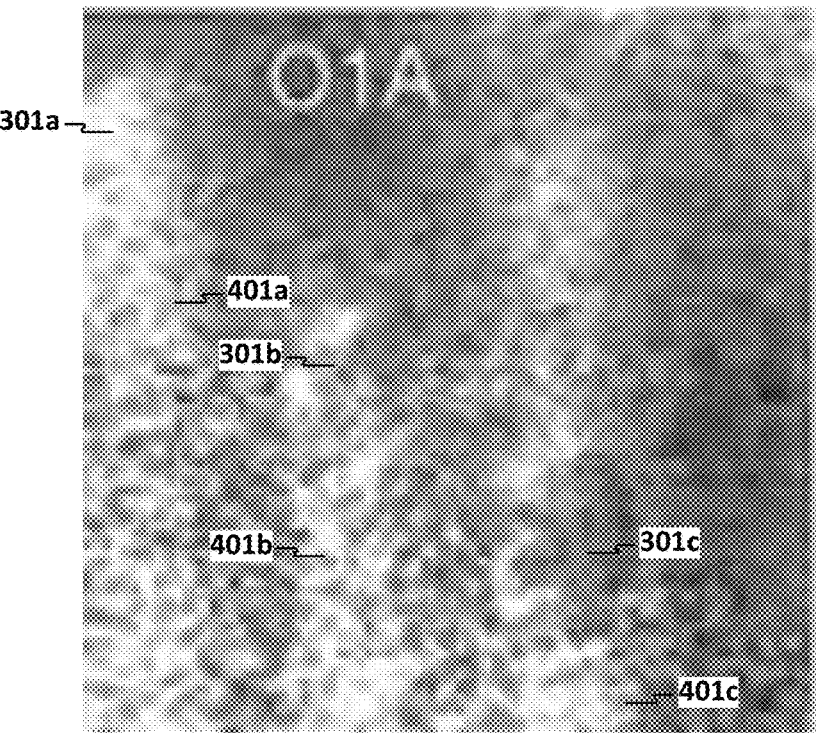
FIGS. 4A through 4D are s-SNOM images using the method disclosed herein.
Figure 4B:
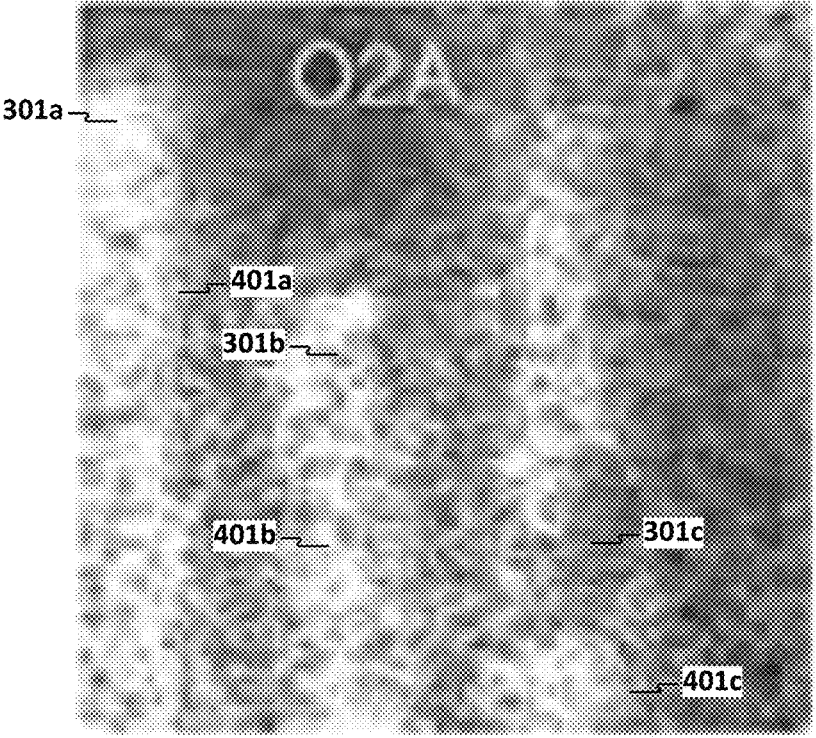
Figure 4C:
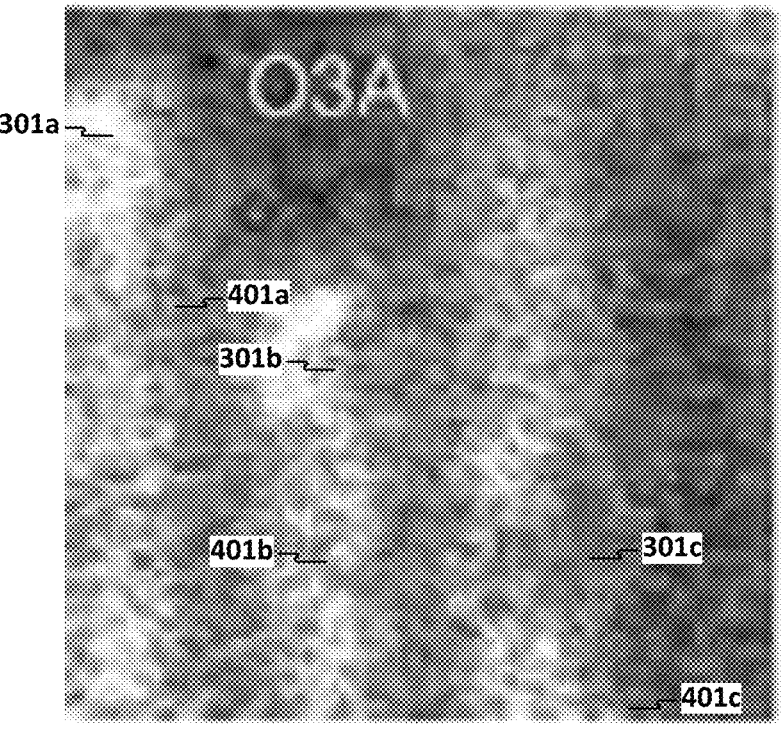
Figure 4D:
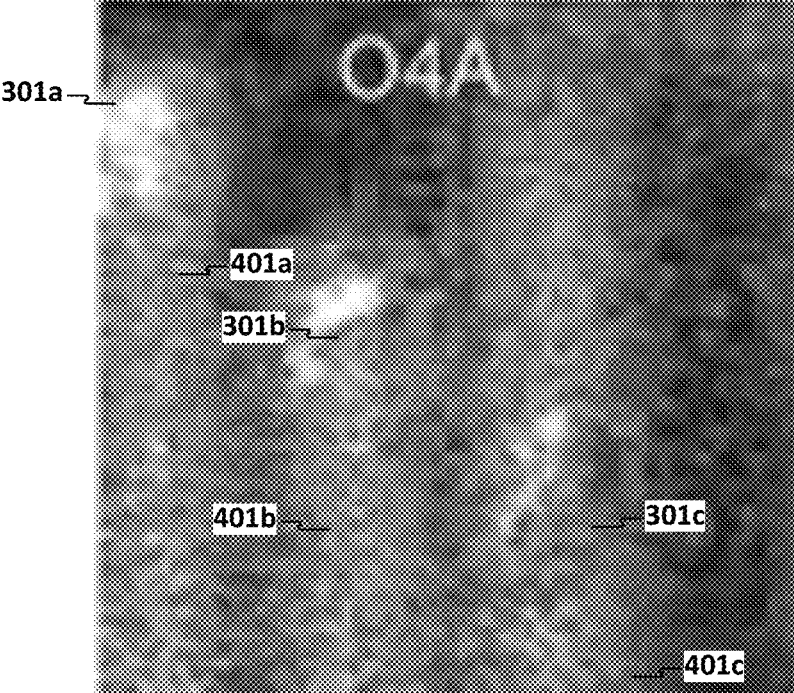

FIG. 3A shows a scanning electron microscope (SEM) image of a portion of one such sample. FIG. 3B is an atomic force microscope (AFM) topography image of a small portion indicated by the box shown. The topography highlights three metal vias 301a-c protruding from the SiO2 surface, with an average distance above the (otherwise featureless) background of roughly 45 nanometers.

The corresponding THz reflection images, for four different harmonic demodulation orders, are shown in FIG. 4A-4D. Here, one can clearly see three underlying vertical metal lines 401a-c which are only faintly visible in the SEM image of FIG. 3A, and do not appear at all in the AFM topography of FIG. 3B, because they are buried under a silica cap layer. Subsequent analysis of this sample indicated that this cap layer is roughly 200 nm thick, about a factor of 5 larger than the radius of the AFM tip. This key experimental result establishes that the apertureless THz near-field imaging technique can indeed be used to study buried features, while preserving the nanoscale spatial resolution, despite the conventional wisdom that the confined near field extends only about one tip diameter away from the end of the AFM tip.

As described above and shown in the associated drawings, the present invention comprises a system and method for scanning near-field optical microscopy. While particular embodiments have been described, it will be understood, however, that any invention appertaining to the system and method described is not limited thereto, since modifications may be made by those skilled in the art, particularly in light of the foregoing teachings. It is, therefore, contemplated by the appended claims to cover any such modifications that incorporate those features or those improvements that embody the spirit and scope of the invention.

What is claimed is:

1. A method for imaging metallic patterns deposited on a surface of semiconductor materials, the method comprising:
    illuminating an apertureless atomic force microscopy (AFM) probe with electromagnetic energy having a frequency in a Terahertz range, the probe having a probe tip, the probe tip having a radius, wherein the electromagnetic energy is redirected by the probe tip onto a sample, the sample comprising a dielectric layer having a thickness greater than the radius; and
    detecting the electromagnetic energy that has interacted with the sample.

2. The method of claim 1, wherein the thickness of the dielectric layer is at least five times greater than the radius.

3. The method of claim 2, wherein the thickness is about 200 nm to about 400 nm.

4. The method of claim 1, further comprising oscillating the probe tip such that the probe tip is between about 5 nm and about 255 nm from the sample.

5. The method of claim 4, wherein the thickness of the dielectric layer is at least five times greater than the radius.

6. The method of claim 5, wherein the thickness is about 200 nm to about 400 nm.

7. The method of claim 1, wherein the dielectric layer overlays the metallic patterns on the surface of the semiconductor materials, and wherein the electromagnetic energy that has interacted with the sample has interacted with the metallic patterns through the dielectric layer.

8. The method of claim 7, further comprising: generating a topographical image of the metallic patterns from the detected electromagnetic energy that has interacted with the sample.

9. A method for non-destructive testing using an atomic force microscope (AFM) probe, the AFM probe having a probe tip, the probe tip having a radius, the method comprising the steps of:
    detecting terahertz electromagnetic energy reflected from a sample, the terahertz electromagnetic energy originating from a collimated light source, said and directed to the probe tip and a surface of the sample, the sample having a dielectric layer with a thickness greater than the radius, and wherein the probe tip oscillates at a distance of between about 5 nm and about 255 nm from the surface of the sample.

10. The method of claim 9, wherein the thickness is about 200 nm to about 400 nm.

11. A system for scanning near-field optical microscopy comprising:
    a collimated light source for emitting collimated light;
    a photoconductive antenna for converting the collimated light into electromagnetic energy having a frequency in a terahertz range;
    an atomic force microscope (AFM) probe, having a probe tip configured to scatter the electromagnetic energy from the photoconductive antenna towards a sample; and
    a detector configured to:
        detect the electromagnetic energy that has interacted with the sample after being scattered by the probe tip, and
        based on the detected electromagnetic energy, generate a modulated signal including topographical information of a metallic pattern in the sample, wherein the metallic pattern is below a dielectric layer having a thickness greater than a radius of the probe tip.

12. The system of claim 11, wherein the thickness is about 200 nm to about 400 nm.

13. The system of claim 11, wherein the AFM probe is configured to oscillate the probe tip at a distance of between about 5 nm and about 255 nm from the sample.

14. The system of claim 13, wherein the thickness is about 200 nm to about 400 nm.

15. The system of claim 11, wherein the thickness of the dielectric layer is at least five times greater than the radius.

16. The system of claim 11, further comprising a demodulator for demodulating the modulated signal at a harmonic of a tapping frequency of the AFM probe.

17. The system of claim 16, wherein the thickness is about 200 nm to about 400 nm.

18. The system of claim 17, wherein the AFM probe is configured to oscillate the probe tip at a distance of between about 5 nm and about 255 nm from the sample.

19. The system of claim 16, further comprising:

a beam splitter configured to split the collimated light into a first portion directed to the photoconductive antenna and a second portion providing a reference signal;

a delay line configured to receive the reference signal; and an electro-optical sampler configured to receive the electromagnetic energy that has interacted with the sample, and generate the modulated signal based on the received electromagnetic energy and the reference signal from the delay line.

20. The system of claim 11, wherein the probe tip comprises a metal tip composed of a platinum-iridium alloy.

\* \* \* \* \*